United States Patent

[11] 3,599,917

| [72] | Inventor | Ben Schwartz |
| | | 901 Bennington Ave. N.E., Massillon, Ohio 44646 |
| [21] | Appl. No. | 887,634 |
| [22] | Filed | Dec. 23, 1969 |
| [45] | Patented | Aug. 17, 1971 |

[54] HOSE NOZZLE SUPPORT STANDARD
10 Claims, 6 Drawing Figs.

[52] U.S. Cl. .................................................. 248/87, 239/276, 248/156, 248/158, 248/186
[51] Int. Cl. .................................................. B05b 17/00
[50] Field of Search .......................................... 248/87, 289, 84, 290, 83, 156, 85, 76, 77, 75, 78, 79, 80, 158, 81, 186, 82, 88; 239/276

[56] References Cited
UNITED STATES PATENTS

| 674,161 | 5/1901 | Brown | 248/87 |
| 1,408,636 | 3/1922 | Power | 248/289 X |
| 1,425,067 | 8/1922 | Stone | 248/88 |
| 1,537,237 | 5/1925 | Kaestner | 248/87 |
| 2,652,218 | 9/1953 | Dean | 248/186 X |

Primary Examiner—Chancellor E. Harris
Attorneys—Clarence A. O'Brien and Harvey B. Jacobson ABSTRACT: An upright standard whose lower end includes a structure for anchoring in the ground and whose upper end includes a support member mounted on the standard for angular adjustment relative thereto about an upstanding axis. The support member includes a mount portion from which the nozzle end of a water hose may be removably supported.

PATENTED AUG 17 1971

3,599,917

Ben Schwartz
INVENTOR.

BY Clarence A. O'Brien
and Harvey B. Jacobson
Attorneys

— 3,599,917 —

HOSE NOZZLE SUPPORT STANDARD

The support standard instant invention has been specifically designed to provide a means whereby the nozzle end of a hose may be supported in elevated position above the ground and in selected position to discharge water therefrom to any portion of the area disposed about and adjacent the support standard.

While many different types of sprinklers have been heretofore designed for the purpose of performing many varied watering operations, there still exists a need for a readily usable structure by which the nozzle end of a garden hose of the like may e supported on the desired position to discharge water on an adjacent lawn or garden area.

While there are sprinklers which can be utilized to perform substantially all watering operations, such sprinklers are usually ground level supported and of the rotary or oscillatable type whereby the area irrigated cannot be determined into the oscillating or rotary sprinkler has completed several oscillations or rotations. In addition, ground-mounted sprinklers attached to the discharge ends of hoses are difficult to transfer from one location to another and sometimes cannot be adjusted to water or irrigate only that area which needs to be watered.

It is accordingly the main object of this invention to provide a novel hose nozzle support standard for support in upstanding position from the ground and including means at its upper end from which the nozzle of the discharge end of a garden hose may be readily removably supported.

Another object of this invention, in accordance with the immediately preceding object is to provide a hose nozzle support standard including a support member on its upper end from which a hose nozzle may be readily removably supported and which is readily angularly adjusted about the longitudinal center axis of the standard.

Still another object of this invention is to provide a hose nozzle support standard capable of removably supporting a garden hose nozzle in elevated position above the ground.

A final object of this invention to be specifically enumerated herein is to provide a garden hose support standard in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation are made fully hereinafter described and claimed, reference being had to the accompanying drawings forming a part hereof, wherein like numerals refer to like parts throughout, and in which:

Figure 6:
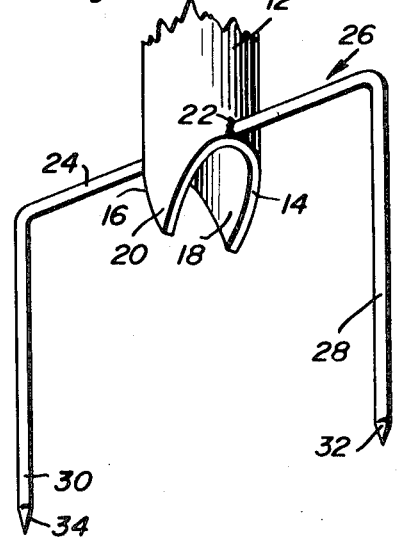
FIG. 6 is a perspective view of the lower end portion of the standard.

Referring now more specifically to the drawings, the numeral 10 generally designates the hose nozzle support standard assembly of the instant invention. The standard 10 includes as upright hollow tubular post 12 and it may be seen from FIGS. 1 and 6 of the drawings that the lower end portion of the post 12 has its opposite side beveled as at 14 and 16 so as to define a pair of diametrically opposite V-shaped ground-piercing elements 18 and 20. Further, diametrically opposite portions of the lower end of the post 12 are provided with aligned radial bores 22 and the upper horizontal fight portion 24 of an inverted U-shaped member referred to in general y the reference numeral 26 is secured through the bores 22. The inverted U-shaped member 26 includes a pair of depending legs 28 and 30 which project downwardly below the ground-piercing elements 18 and 20 and include pointed lower ends 32 and 34.

Figure 2:
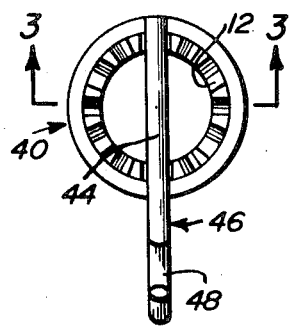
FIG. 2 is an enlarged top plan view of the support member portion of the standard carried by the upper end of the latter and from which a hose nozzle may be removably supported.
Figure 4:
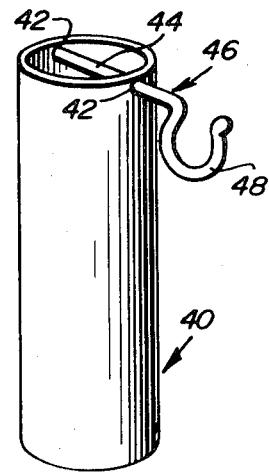
FIG. 4 is a perspective view of the support member portion of the standard.
Figure 5:
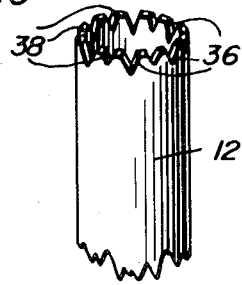
FIG. 5 is a perspective view of the upper end of the st standard portion of the invention.
Figure 3:
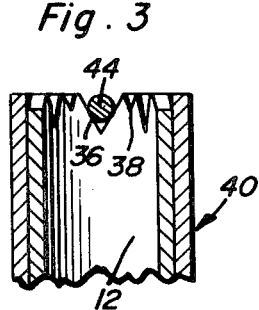
FIG. 3 is a fragmentary vertical sectional view taken substantially upon the plane indicated by the section line 3-3 of FIG. 2.

With attention now invited more specifically to FIGS. 2, 3 and 5 of the drawings it may be seen that the upper end of the tubular post 12 includes six evenly circumferentially spaced upwardly opening notches 36 and six further notches 38 disposed between adjacent notches 36. The notches 26 are approximately three-quarters of an inch deep a nd the notches 38 are approximately a quarter of an inch deep.

The support standard assembly 10 further includes an upper tubular support member referred to in general by the reference numeral 40 and it is to be noted that the tubular support member 40 is telescopingly receivable over the upper end of the post 12. The upper and lower ends of the tubular support member 40 are open and the upper end of the tubular support member 40 includes a pair of diametrically opposite aligned radial bores 42 through which the straight shank portion 44 of a hook member referred to in general by the reference numeral 46 is secured. The hook member 46 includes a hook 48 on the end thereof which projects outwardly from the tubular support member 40 and the hook 48 opens upwardly and is disposed in a diametric plane of the tubular support member 40.

When the tubular support member 40 is telescoped downwardly over the upper end of the post 12, the opposite end portions of the shank portion 44 spaced immediately inwardly of the walls of that tubular support member 40 are receivable in diametrically opposite pairs of the slots 36 or the slots 38. Thus, with the opposite end portions of the shank portion 44 cradled either in a pair of diametrically opposite slots 36 or a pair of diametrically opposite slots 38, the tubular support member 40 is keyed to the post against rotation relative thereto.

Figure 1:
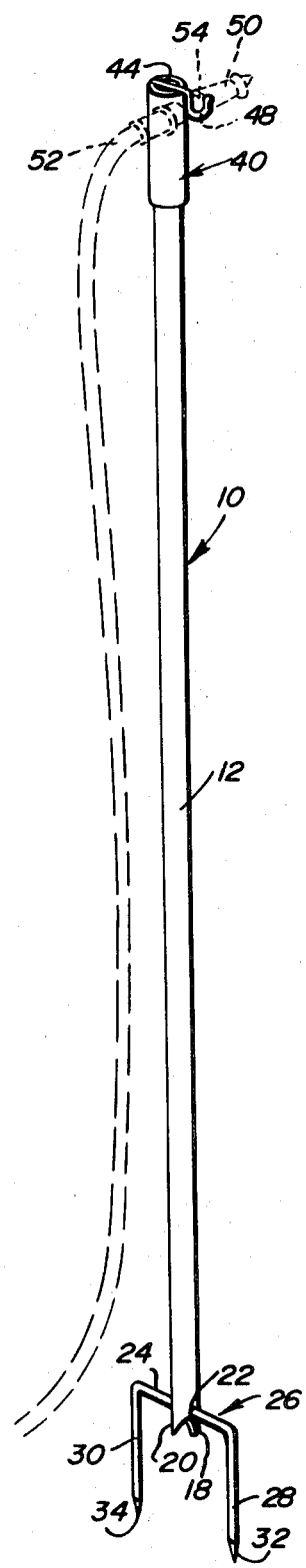
FIG. 1 is a perspective view of the hose nozzle support standard.

From FIG. 1 of the drawings it may be seen that the hook 48 may have the nozzle assembly 50 of a garden hose 52 removably engaged therewith. The nozzle assembly 50 includes a circumferential slot 54, as is usual, and the slotted portion of the nozzle assembly 50 is supported from the hook 48 whereby the nozzle assembly 50 will be positioned stationarily relative to the tubular support member 40.

In operation, the post 12 is first downwardly inserted into the ground adjacent the area which is to be watered. The legs 28 and 30 and the ground-piercing elements 18 and 20 may be forced into the ground by a person standing on either one of both ends of the bight portion 24 so as to force the lower end of the post 12 down into the ground. Thereafter, the tubular support member 40 is adjustably rotatably positioned as desired and the nozzle assembly 50 of the hose 52 is engaged with the hook 48 in order that the nozzle assembly 50 will be supported above the ground from which the standard assembly 10 is supported toward the area which is to be watered.

It will be noted that any suitable material may be utilized in the construction of the support standard assembly 10. It is preferable that the post 12 and the U-shaped member 26 be constructed of metallic materials but it is possible that the tubular support member 40 and hook member 46 could be constructed of other materials. In any event, the opposite end portions of the bight portion 24 are received through the bores 22 and the opposite end portions of the shank portion 44 are received through the bores 42 so as to greatly strengthen the connection between the U-shaped member 26 and the post 12 and between the hook member 46 and the tubular support 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What I claim as new is as follows:

1. An upright standard, means on the lower end of said standard adapted to support the latter in an upright position from the ground, support member means carried by the upper end of the standard and mounted thereon for adjustable angular displacement about an upstanding axis, said support member means including means adapted to supportingly engage a hose nozzle with the hose nozzle stationarily supported therefrom, said means on the lower end of the standard including a downwardly opening U-shaped member having a pair of depending legs which project downwardly below the lower end of the standard for downward insertion into the ground upon which the lower end of the standard is to be rested and also spaced-apart portions on the lower terminal end of the standard defining generally V-shaped ground-piercing elements, at least the lower end of said standard being tubular and said ground-piercing elements comprising diametrically opposite wall portions of said standard.

2. The combination of claim 1 wherein said means adapted to supportingly engage a hose nozzle includes an upwardly opening U-shaped hook supported from said support member means.

3. An upright standard, means on the lower end of said standard adapted to support the latter in an upright position from the ground, support member means carried by the upper end of the standard and mounted thereon for adjustable angular displacement about an upstanding axis, said support member means including means adapted to supportingly engage a hose nozzle with the hose nozzle stationarily supported therefrom, the support member means carried by the upper end of the standard including a sleeve member telescoped down over the upper end of said standard and said sleeve member including coacting detent means operably to releasably retain said tubular support member in adjusted rotated positions on said standard, said coacting detent means including pairs of diametrically opposite upwardly opening notches formed in the upper end edged of said standard and a diametric shank portion secured across the upper end portion of said tubular member, the opposite end portions of said shank portion being seatingly receivable in said pairs of diametrically opposite notches, said means adapted to supportingly engage a hose nozzle including an upwardly opening U-shaped hook supported from said support member means.

4. The combination of claim 3 wherein one end of said shank portion projects outwardly of said tubular support member and said hook is supported from the outer end of the extended end portion of said shank portion.

5. The combination of claim 4 wherein said means on the lower end of the standard includes a downwardly opening U-shaped member having a pair of depending legs which project downwardly below the lower end of the standard for downward insertion into the ground upon which the lower end of the standard is to be rested.

6. The combination of claim 5 wherein said means at the lower end of said standard also includes spaced-apart portions of the lower terminal end of the standard defining generally V-shaped ground-piercing elements.

7. The combination of claim 6 wherein at least the lower end of said standard is tubular and said ground-piercing elements comprise diametrically opposite wall portions of said standard.

8. An upright standard including support means for supporting said standard in an upright position from a suitable support, the upper end of said standard including means defining at least one transversely extending upwardly opening groove, a support sleeve telescoped downwardly over the upper end of said standard and including an upper end elongated and transversely extending abutment member extending between and supported from remote wall portions of said sleeve and seatable in said groove, said elongated member including an extended end portion extending outwardly from said sleeve and adapted to removably support an object therefrom 9. The combination of claim 8 wherein said means at the upper end of said standard define a plurality of relatively angulated diametric grooves, said elongated member being disposed on a diameter of said sleeve.

10. The combination of claim 8 wherein said extended end portion of said elongated member includes a terminal end hook member for supportingly engaging a hose nozzle.